United States Patent
Pizel et al.

(10) Patent No.: US 6,986,017 B2
(45) Date of Patent: Jan. 10, 2006

(54) BUFFER PRE-REGISTRATION

(75) Inventors: Travis James Pizel, Rochester, MN (US); Thomas Rembert Sand, Rochester, MN (US); William Alan Thompson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 354 days.

(21) Appl. No.: 10/422,215

(22) Filed: Apr. 24, 2003

(65) Prior Publication Data
US 2004/0215907 A1 Oct. 28, 2004

(51) Int. Cl.
*G06F 12/00* (2006.01)
(52) U.S. Cl. ............................ 711/206; 711/207
(58) Field of Classification Search ............... 709/213, 709/214; 711/147–149, 152, 153, 163, 202, 711/206
See application file for complete search history.

(56) References Cited

U.S. PATENT DOCUMENTS

| | | | | |
|---|---|---|---|---|
| 4,945,480 A | * | 7/1990 | Clark et al. | 711/6 |
| 5,361,356 A | * | 11/1994 | Clark et al. | 711/206 |
| 5,583,976 A | * | 12/1996 | Bullard, Jr. | 345/440 |
| 6,747,949 B1 | * | 6/2004 | Futral | 370/231 |
| 6,823,437 B2 | * | 11/2004 | Boyd et al. | 711/170 |

* cited by examiner

*Primary Examiner*—T Nguyen
(74) *Attorney, Agent, or Firm*—Owen J. Gamon

(57) ABSTRACT

A method, apparatus, system, and signal-bearing medium that in an embodiment pre-register buffers remotely and create tokens locally that represent the buffers prior to a data transfer operation that uses the tokens to access the buffers. In an embodiment, the buffers are pre-registered via a translation table, and the tokens are used as an offset into the translation table. In an embodiment, the pre-registration verifies that the buffer is within memory allocated to a logical partition, which protects against the risk of address corruption.

15 Claims, 7 Drawing Sheets

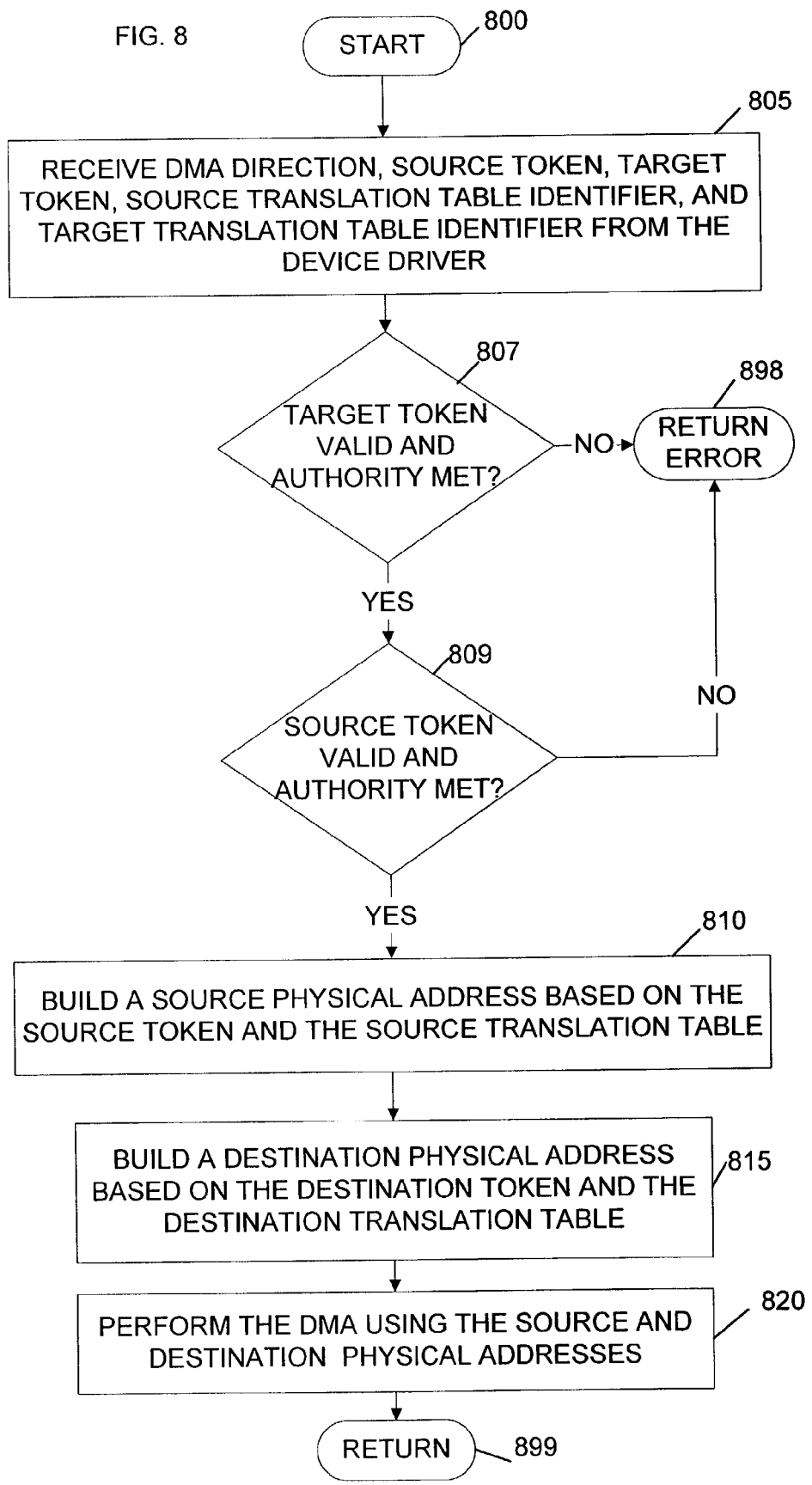

BUFFER PRE-REGISTRATION

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

FIELD

An embodiment of the invention generally relates to computers. In particular, an embodiment of the invention generally relates to pre-registering buffers in a logically-partitioned computer.

BACKGROUND

Computer technology continues to advance at a rapid pace, with significant developments being made in both software and in the underlying hardware upon which the software executes. One significant advance in computer technology is the development of multi-processor computers, where multiple computer processors are interfaced with one another to permit multiple operations to be performed concurrently, thus improving the overall performance of such computers. Also, a number of multi-processor computer designs rely on logical partitioning to allocate computer resources to further enhance the performance of multiple concurrent tasks.

With logical partitioning, a single physical computer is permitted to operate essentially like multiple and independent virtual computers (referred to as logical partitions), with the various resources in the physical computer (e.g., processors, memory, data structures, and input/output devices) allocated among the various logical partitions. Each logical partition may execute a separate operating system, and from the perspective of users and of the software applications executing on the logical partition, operates as a fully independent computer.

Logical partitions may transfer data to each other, not only to another logical partition operating on the same computer, but also to another logical partition operating on a different computer connected via a network. Logical partitions often transfer data via an operation known as a DMA (Direct Memory Access), which is a technique for transferring data without the direct involvement of the processor, which speeds up not only the data transfer operation, but also the performance of the entire computer. In order to perform the cross-system DMA operation, the computer performing the DMA must be given (from the remote computer) an address on the remote computer to be used as either the source or the destination of the DMA operation. When this passing of addresses is done at the device driver level within a partition, there is a risk of address corruption (either accidentally or maliciously), which results in data being transferred to an address that could have adverse effects on either computer. Logically partitioned computers have a special risk for this type of corruption because they run multiple operating systems and applications in multiple partitions, all of whom may have been designed by different developers.

Without a better way of transferring data, logically-partitioned systems will continue to suffer from the risk of address corruption. Although the aforementioned problems have been discussed in the context of a logically-partitioned computer system, these problems may occur with any type of system.

SUMMARY

A method, apparatus, system, and signal-bearing medium are provided that in an embodiment pre-register buffers and create tokens that represent the buffers prior to a data transfer operation that uses the tokens to access the buffers. In an embodiment, the buffers are pre-registered via a translation table, and the tokens are used as an offset into the translation table. In an embodiment, the pre-registration verifies that the buffer is within memory allocated to a logical partition, which protects against the risk of address corruption.

BRIEF DESCRIPTION OF THE DRAWINGS

FIG. 8 depicts a flowchart of example processing for performing a DMA (Direct Memory Access) function, according to an embodiment of the invention.

DETAILED DESCRIPTION

Figure 1:
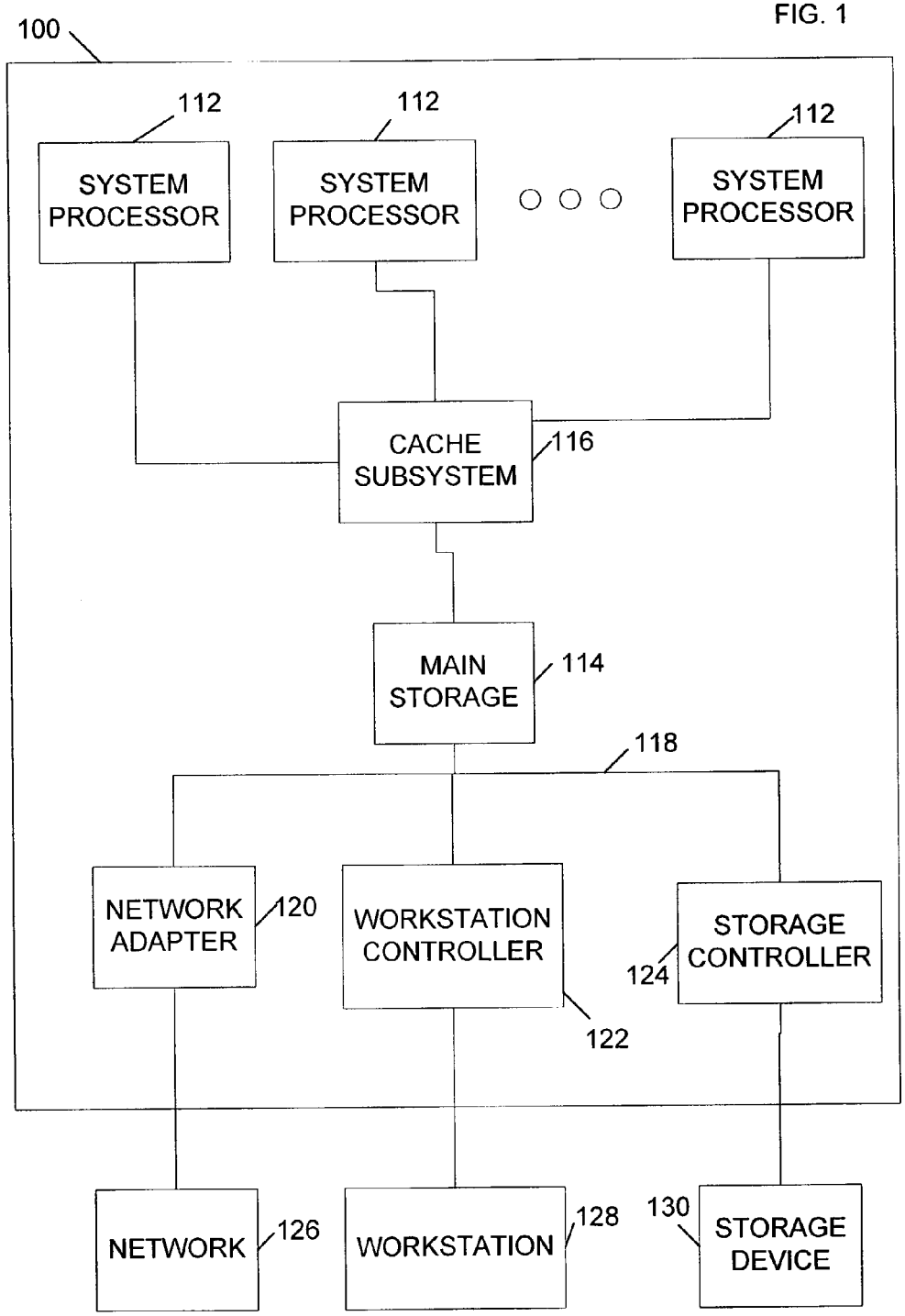
FIG. 1 depicts a block diagram of an example electronic device for implementing an embodiment of the invention.

Turning to the drawings, wherein like numbers denote like parts throughout the several views, FIG. 1 illustrates a data processing apparatus or electronic device 100 consistent with an embodiment of the invention. The electronic device 100 generically represents, for example, any of a number of multi-user computer systems such as a network server, a midrange computer, or a mainframe computer. But, embodiments of the invention may be implemented in other data processing apparatus, e.g., in stand-alone or single-user computer systems such as workstations, desktop computers, portable computers, pocket computers, tablet computers, or in other devices that have an embedded computing device, such as an embedded controller in a teleconferencing system, appliance, pager, telephone, automobile, PDA (Personal Digital Assistant), or any other appropriate device. One suitable implementation of an embodiment of the electronic device 100 is in a midrange computer such as the eServer pSeries computer available from International Business Machines Corporation.

The electronic device 100 generally includes one or more system processors 112 coupled to a memory subsystem including a main storage 114, e.g., an array of dynamic random access memory (DRAM), but in other embodiments any appropriate main storage may be used. Also illustrated as interposed between the processors 112 and the main storage 114 is a cache subsystem 116, typically including one or more levels of data, instruction and/or combination caches, with certain caches either serving individual processors or multiple processors. Furthermore, the main storage 114 is coupled to any number of types of external (I/O) devices via a system bus 118 and a plurality of interface devices, e.g., a network adapter 120, a workstation controller 122, and a storage controller 124, which respectively provide external access to one or more external networks 126, one or more workstations 128, and/or one or more storage devices 130.

The processors 112 represent central processing units of any type of architecture, such as a CISC (Complex Instruction Set Computing), RISC (Reduced Instruction Set Computing), VLIW (Very Long Instruction Word), or a hybrid architecture, although any appropriate processor may be used. In various embodiments, the processors 112 may be of all the same type or some or all may be of different types. The processors 112 execute instructions and typically include control units that organize data and program storage in memory and transfer data and other information between the various parts of the electronic device 100.

The system bus 118 may represent one or more busses, e.g., PCI (Peripheral Component Interconnect), ISA (Industry Standard Architecture), X-Bus, EISA (Extended Industry Standard Architecture), or any other appropriate bus and/or bridge (also called a bus controller).

The network adapter 120 interfaces directly or indirectly to the network 126 and serves to pass messages and transfer data between the electronic device 100 and the network 126. In various embodiments the network adapter 120 may be a hardware device or a combination of hardware and software.

The network 126 may be any suitable network or combination of networks and may support any appropriate protocol suitable for communication of data and/or code to/from the electronic device 100. In an embodiment, the network 126 may support Infiniband. In another embodiment, the network 126 may support wireless communications. In another embodiment, the network 126 may support hard-wired communications, such as a telephone line or cable. In another embodiment, the network 126 may support the Ethernet IEEE (Institute of Electrical and Electronics Engineers) 802.3x specification. In another embodiment, the network 126 may be the Internet and may support IP (Internet Protocol). In another embodiment, the network 126 may be a local area network (LAN) or a wide area network (WAN). In another embodiment, the network 126 may be a hotspot service-provider network. In another embodiment, the network 126 may be an intranet. In another embodiment, the network 126 may be a GPRS (General Packet Radio Service) network. In another embodiment, the network 126 may be any appropriate cellular data network or cell-based radio network technology. In another embodiment, the network 126 may be an IEEE 802.11B wireless network. In still another embodiment, the network 126 may be any suitable network or combination of networks. Although one network 126 is shown, in other embodiments any number of networks (of the same or different types) may be present, including zero.

The storage device 130 represents one or more mechanisms for storing data. For example, the storage device 130 may include read only memory (ROM), random access memory (RAM), magnetic disk storage media, optical storage media, flash memory devices, and/or other machine-readable media. In other embodiments, any appropriate type of storage device may be used. Although only one storage device 130 is shown, multiple storage devices and multiple types of storage devices may be present. Although the storage device 130 is shown to be connected to the storage controller 124, in other embodiments, the storage device 130 may be accessed via the network 126. Although the storage device 130 is shown to be external to the electronic device 100, in another embodiment, the storage device 130 may be internal to the electronic device 100.

The hardware and software depicted in FIG. 1 may vary for specific applications and may include more or fewer elements than those depicted and may be arranged differently than depicted. For example, other peripheral devices such as audio adapters, or chip programming devices, such as EPROM (Erasable Programmable Read-Only Memory) programming devices may be used in addition to or in place of the hardware already depicted.

Figure 2:
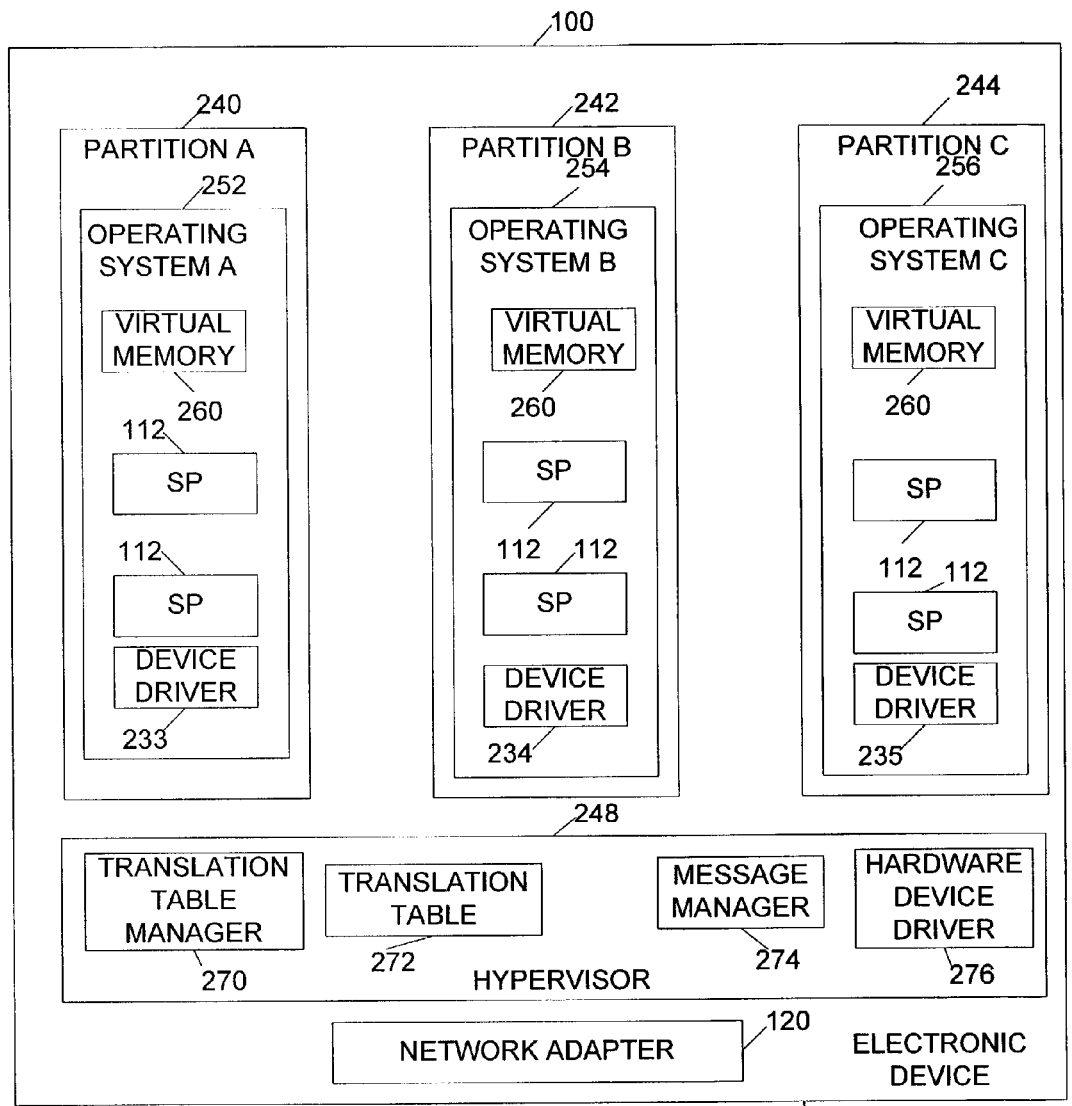
FIG. 2 depicts a block diagram of the primary hardware and software components and resources of an embodiment of the invention.
Figure 2:
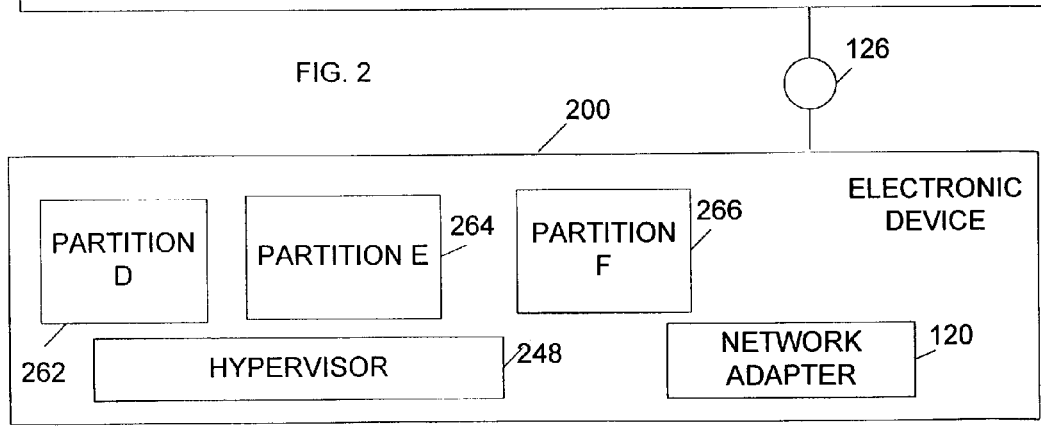

FIG. 2 illustrates in greater detail the primary software and hardware components and resources utilized in implementing a logically-partitioned computing environment on the electronic device 100, which includes a plurality of logical partitions 240, 242, and 244 managed by a hypervisor 248, according to an embodiment of the invention. All or only a portion of the logical partitions 240, 242, and 244 and the hypervisor 248 may at various times exist in the main storage 114, the cache subsystem 116, and/or the storage device 130 and in various embodiments may be transmitted and/or received across the network 126, as previously shown in FIG. 1.

Each logical partition 240, 242, and 244 utilizes an operating system (e.g., operating systems 252, 254, and 256 for the logical partitions 240, 242, and 244, respectively), which controls the primary operations of the logical partition in much the same manner as the operating system of a non-partitioned computer. For example, each operating system 252, 254, and 256 may be implemented using the OS/400 operating system available from International Business Machines Corporation, residing on top of a kernel, e.g., AS/400 system licensed internal code (SLIC). In various embodiments, the operating systems 252, 254, and 256 may be the same or some or all of them may be different.

Each logical partition 240, 242, and 244 executes in a separate, or independent, memory space, represented by virtual memory 260. Moreover, each logical partition 240, 242, and 244 is statically and/or dynamically allocated a portion of the available resources in the electronic device 100. For example, each logical partition is allocated one or more processors 112, as well as a portion of the available memory space for use in the virtual memory 260. In an embodiment, the logical partitions 240, 242, and 244 may share specific hardware resources such as processors, such that a given processor is utilized by more than one logical partition. In another embodiment, the hardware resources can be allocated to only one logical partition at a time.

Each of the logical partitions 240, 242, and 244 may include a respective device driver 233, 234, and 235, which operate to send and/or receive data with another logical partition, which may be on the same electronic device or a different electronic device. Although the device drivers 233, 234, and 235 are shown within their respective operating systems 252, 254, and 256, in other embodiments some or all of the device drivers may be applications in the respective partitions 240, 242, and 244. Although three logical partitions 240, 242, and 244 are shown in FIG. 2, other embodiments may support any number of logical partitions.

The hypervisor 248 is a partition manager, which is a resource shared among the logical partitions. The hypervisor 248 manages the logical partitions and facilitates the allocation of resources among the different logical partitions. The hypervisor 248 includes a translation table manager 270, a translation table 272, a message manager 274, and a hardware device driver 276. The translation table manager 270, the message manager 274, and the hardware device driver 276 include instructions capable of being executed on the processors 112 or statements capable of being interpreted by instructions executing on the processors 112. In various other embodiments, some or all of the functions of the present invention may be carried out partially or entirely via hardware.

The translation table manager 270 manages the translation table 272 to pre-register buffers in the virtual memory 260 prior to transferring data to and from the buffers. The functions of the translation table manager 270 are further described below with reference to FIGS. 5, 6, and 7. The translation table 272 includes a data structure for pre-registering buffers as further described below with reference to FIG. 3. The message manager 274 interacts with the network adapter 120 to pass messages across the network 126. The hardware device driver 276 interfaces to the network adapter 120 to perform a DMA (Direct Memory Access) operation across the network 126. The functions of the hardware device driver 276 are further described below with reference to FIG. 8.

Additional resources, e.g., mass storage, backup storage, user input, network connections, and the like, are typically allocated to one or more of the logical partitions 240, 242, and 244 by the hypervisor 248. The hypervisor 248 may allocate resources in a number of manners, e.g., on a bus-by-bus basis or on a resource-by-resource basis, with multiple logical partitions sharing resources on the same bus. Some resources may even be allocated to multiple logical partitions at a time.

The network 126 is also connected to an electronic device 200, which includes partitions 262, 264, and 266 analogous to the partitions 240, 242, and 244 already described above for the electronic device 100. The electronic device 200 also includes an instance of the hypervisor 248 and the network adapter 120. The instance of the hypervisor 248 in the electronic device 200 may include instances of the translation table manager 270, the translation table 272, the message manager 274, and the hardware device driver 276, as previously described above with reference to the electronic device 100. The various partitions in the electronic devices 100 and 200 may send and receive messages and transfer data to each other via the network adapters 120 and the network 126. The electronic device 200 may also include other elements not necessary for an understanding of an embodiment of the invention.

The various software components and resources illustrated in FIG. 2 and implementing the embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the electronic devices 100 and 200, and that, when read and executed by one or more processors in the electronic devices 100 and 200, cause the electronic device to perform the steps necessary to execute steps or elements embodying the various aspects of an embodiment of the invention. Moreover, while embodiments of the invention have and hereinafter will be described in the context of fully functioning electronic devices, the various embodiments of the invention are capable of being distributed as a program product in a variety of forms, and that the invention applies equally regardless of the particular type of signal-bearing medium used to actually carry out the distribution. Examples of signal-bearing media include but are not limited to recordable-type media such as volatile and non-volatile memory devices, floppy and other removable disks, hard disk drives, magnetic tape, optical disks (e.g., CD-ROM's, DVD's, etc.), among others.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIGS. 1 and 2 are not intended to limit the present invention. Indeed, other alternative hardware and/or software environments may be used without departing from the scope of the invention.

Figure 3:
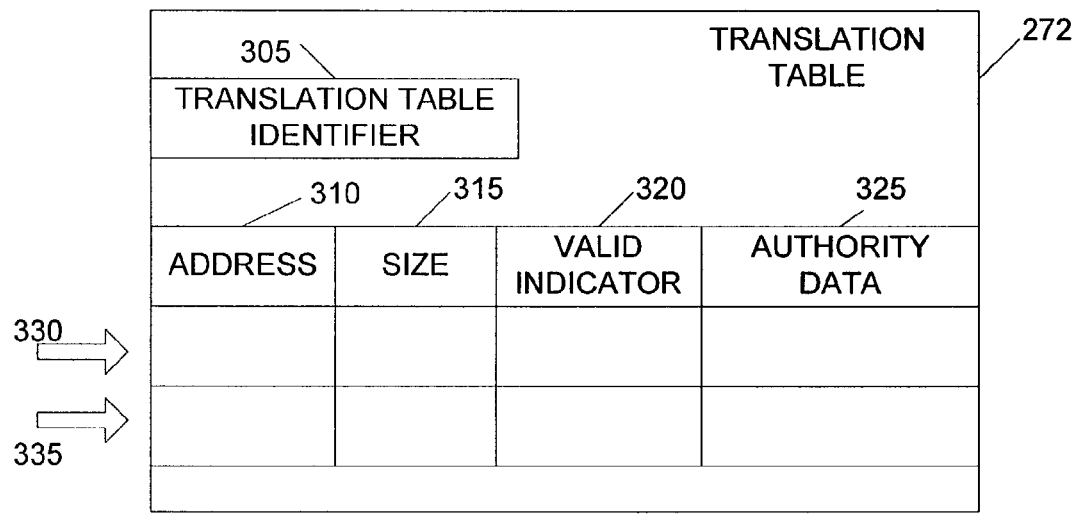
FIG. 3 depicts a block diagram of an example translation table data structure, according to an embodiment of the invention.

FIG. 3 depicts a block diagram of an example translation table data structure 272, according to an embodiment of the invention. The translation table 272 includes a translation table identifier 305 and entries 330 and 335.

The translation table identifier 305 identifies the particular translation table since, although only one translation table 272 is shown, any number may be present, and the translation table manager 270 may use the translation table identifier 305 to distinguish between them. In an embodiment, the translation table identifier 305 includes a connection identifier that identifies the connection that the sending partition and the receiving partition use to transmit data.

Each of the entries 330 and 335 includes an address field 310, a size 315, a valid indicator 320, and an authority data field 325. Although two entries 330 and 335 are shown, in other embodiments any number of entries are present.

The address 310 identifies the location of the buffer in the virtual memory 260 from which or to which data is to be transferred. The size 315 indicates the size of the buffer identified by the address 310.

The valid indicator 320 indicates whether the buffer indicated by the address 310 has been pre-registered. In an embodiment, when the valid indicator is on, the buffer is pre-registered, and when the valid indicator is off, the buffer has not yet been pre-registered.

The authority data field 325 indicates the operations that the partition is allowed to perform. In various embodiments, the authority data field 325 may include such authorities as read only, write only, and read/write, but in other embodiments any appropriate authorities may be used.

Figure 4:
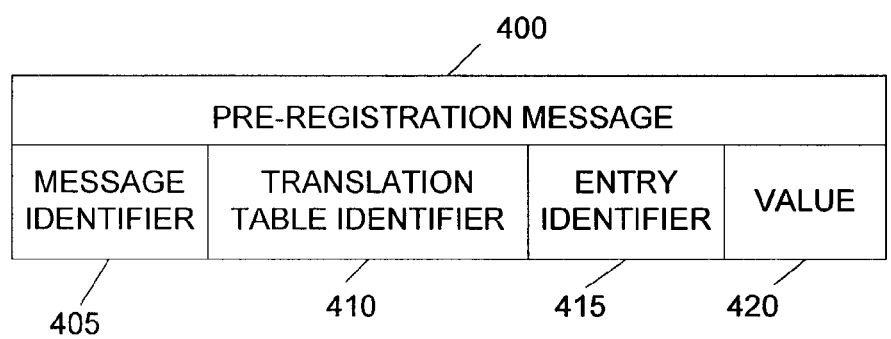
FIG. 4 depicts a block diagram of an example message data structure, according to an embodiment of the invention.

FIG. 4 depicts a block diagram of an example pre-registration message 400, according to an embodiment of the invention. The pre-registration message 400 includes a message identifier 405, a translation table identifier 410, an entry identifier 415, and a value 420.

The message identifier 405 uniquely identifies the pre-registration message 400, and in an embodiment the message identifier 405 may be a sequence number that is incremented from one message to the next, but in other embodiments any appropriate message identifier may be used. The translation table identifier 410 identifies the translation table 272 that is associated with the message 400 and corresponds to the translation table identifier 305 of the associated translation table 272. The entry identifier 415 identifies an associated entry, such as the entry 330 or 335, in the translation table 272 and in various embodiments may be a pointer or an offset within the table. The value 420 includes an entry, such as the entry 330 or 335, from the translation table 272.

Figure 5:
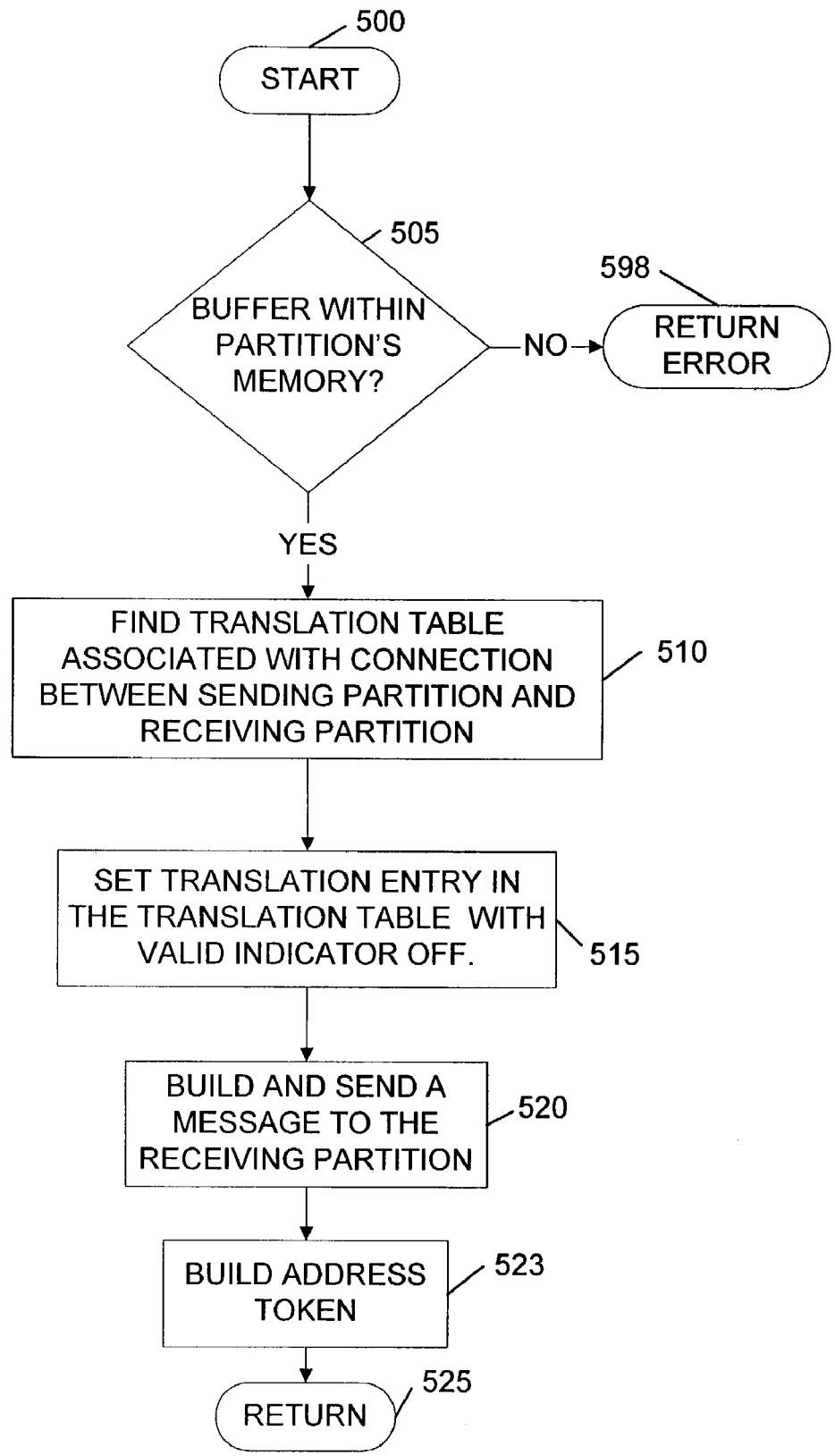
FIG. 5 depicts a flowchart of example processing for a function in a translation table manager to pre-register a buffer, according to an embodiment of the invention.

FIG. 5 depicts a flowchart of example processing for a function in the translation table manager 270 to pre-register a buffer, according to an embodiment of the invention. In an embodiment, the device driver 233, 234, or 235 uses a hypervisor call to invoke the logic shown in FIG. 5 and passes an address of a buffer that the device driver requests to pre-register and a connection identifier that the device driver requests to use to send data from the buffer or receive data into the buffer. Thus, the logic of FIG. 5 may be invoked by both a partition that intends to send data via a DMA operation and desires to pre-register a source buffer and by a partition that intends to receive data via a DMA operation and desires to pre-register a destination buffer.

Control begins at block 500. Control then continues to block 505 where the translation table manager 270 determines whether the buffer is within the memory 260 allocated to the partition associated with the invoking device driver 233, 234, or 235. If the determination at block 505 is false, then control continues to block 598 where an error is returned to the invoking device driver 233, 234, or 235.

If the determination at block 505 is true, then control continues to block 510 where the translation table manager 270 finds the translation table 272 associated with the connection identifier and the connection between the sending partition and the receiving partition. Control then continues to block 515 where the translation table manager 270 sets the translation entry in the translation table 272, including the address 310, the size 315, and the authority data 325 from values passed from the invoking device driver 233, 234, or 235. The translation table manager 270 further sets the valid indicator 320 off, indicating that the buffer associated with this entry has not yet been pre-registered. Control then continues to block 520 where the translation table manager 270 builds the message 400 by setting the message identifier 405 to identify the message 400, setting the translation table identifier 410 to identify the translation table 272 associated with the connection, setting the entry identifier 415 to identify the entry, such as the entry 330 or 335, in the translation table 272, and setting the value 420 to hold the entry. The translation table manager 270 then uses the message manager 274 to send the message 400 to an electronic device associated with the receiving partition, which is determined from the connection identifier.

Control then continues to block 523 where the translation table manager 270 builds an address token that represents the buffer. In an embodiment, the address token includes an indication of the entry in the translation table 300, corresponding to the entry identifier 415, and an offset into the buffer from the address 310. Control then continues to block 525 where the translation table manager 270 returns the address token to the device driver 233, 234, or 235. The buffer is now pre-registered for use by a data transfer operation. In this way, both a source data buffer associated with a source partition on a source electronic device and a destination data buffer associated with a destination partition on a destination electronic device are pre-registered. In various embodiments, the source electronic device and the destination electronic device may be the same electronic device or different electronic devices. In another embodiment, the address token is not built at block 523 and returned at block 525; instead the address token is built at block 720 and returned at block 799, as further described below.

Figure 6:
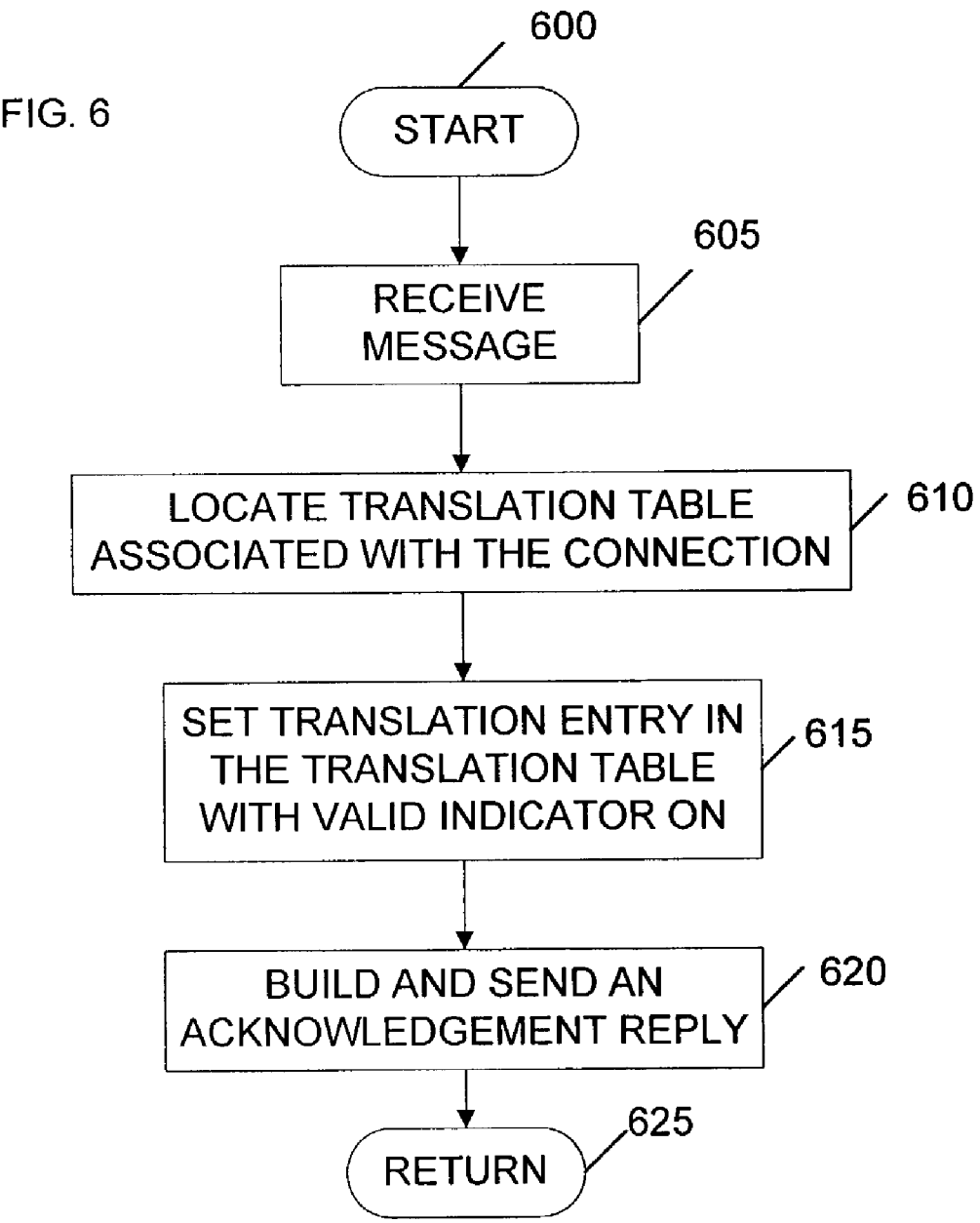
FIG. 6 depicts a flowchart of example processing for a function in a translation table manager for responding to a pre-registration message, according to an embodiment of the invention.

FIG. 6 depicts a flowchart of example processing for a function in the translation table manager 270 for responding to the pre-registration message 400, according to an embodiment of the invention. Control begins at block 600. Control then continues to block 605 where the message manager 274 in the hypervisor 248 associated with the receiving partition receives the pre-registration message 400 and forwards it to the translation table manager 270 associated with the receiving electronic device. Control then continues to block 610 where the translation table manager 270 locates the translation table 272 associated with the translation table identifier 410 in the received pre-registration message 400 using the translation table identifier 305. Control then continues to block 615 where the translation table manager 270 finds the appropriate entry in the translation table 272 using the entry identifier 415, sets the entry to be the value 420 and sets the valid indicator 320 on. Control then continues to block 620 where the translation table manager 270 builds and sends an acknowledgement reply to the electronic device that initiated the pre-registration message 400. Control then continues to block 625 where the function returns.

Figure 7:
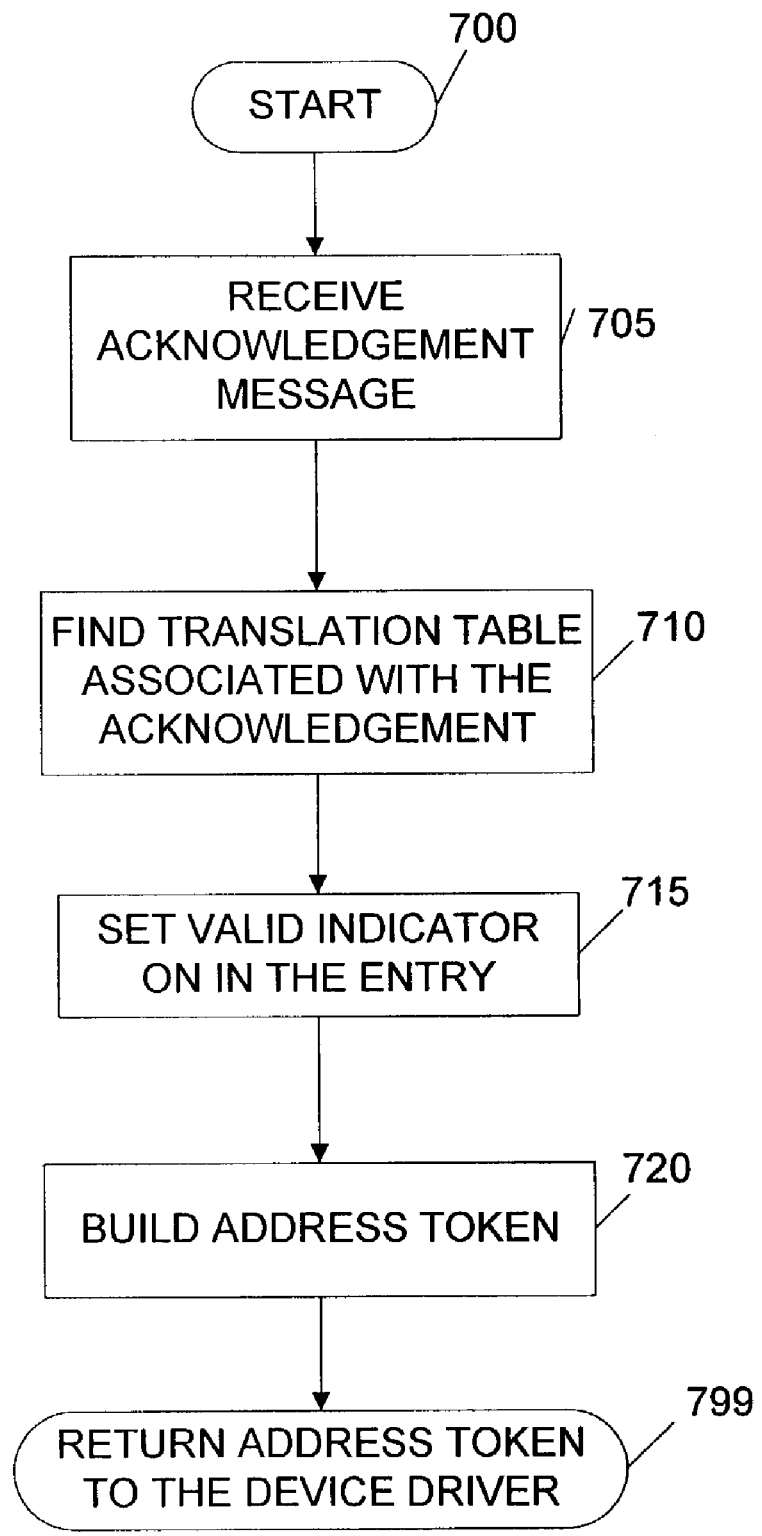
FIG. 7 depicts a flowchart of example processing for a function in a translation table manager for responding to an acknowledgement message, according to an embodiment of the invention.

FIG. 7 depicts a flowchart of example processing for a function in the translation table manager 270 for responding to an acknowledgement message, according to an embodiment of the invention. Control begins at block 700. Control then continues to block 705 where the message manager 274 receives the acknowledgment message and forwards it to the translation table manager 270. Control then continues to block 710 where the translation table manager 270 finds the translation table 272 associated with the acknowledgement message. Control then continues to block 715 where the translation table manager 270 sets the valid indicator 320 on in the entry. Control then continues to block 720 where the translation table manager 270 builds an address token that represents the buffer. In an embodiment, the address token includes an indication of the entry in the translation table 300, corresponding to the entry identifier 415, and an offset into the buffer from the address 310. Control then continues to block 799 where the translation table manager 270 returns the address token to the device driver 233, 234, or 235. The buffer is now pre-registered for use by a data transfer operation. In this way, both a source data buffer associated with a source partition on a source electronic device and a destination data buffer associated with a destination partition on a destination electronic device are pre-registered. In various embodiments, the source electronic device and the destination electronic device may be the same electronic device or different electronic devices. In another embodiment, the address token is not built at block 720 and returned at block 799; instead the address token is built at block 523 and returned at block 525, as previously described above.

FIG. 8 depicts a flowchart of example processing for performing a DMA (Direct Memory Access) function using a pre-registered source buffer and a pre-registered destination buffer, according to an embodiment of the invention. Control begins at block 800. Control then continues to block 805 where the hardware device driver 276 receives a DMA direction indicating whether the DMA is a read or write, a source token identifying a pre-registered source buffer, a target token identifying a pre-registered destination buffer, an identifier of the source translation table having an entry for the pre-registered source buffer, and an identifier of the target translation table having a pre-registered destination buffer from the device driver 233, 234, or 235.

Control then continues to block 807 where the hardware device driver 276 determines whether the valid indicator 320 associated with the target token is on and whether the condition or conditions specified by the authority data 325 associated with the target token are met. If the determination at block 807 is false, then control continues to block 898 where an error is returned.

If the determination at block 807 is true, then control continues to block 809 where the hardware device driver 276 determines whether the valid indicator 320 associated with the source token is on and whether the condition or conditions specified by the authority data 325 associated with the source token are met. If the determination at block 809 is false, then control continues to block 898 where an error is returned.

If the determination at block 809 is true, then control then continues to block 810 where the hardware device driver 276 builds a source physical address based on the source token and the source translation table. Control then continues to block 815 where the hardware device driver 276 builds a target physical address based on the target token and the target translation table. Control then continues to block 820 where the hardware device driver 276 performs a DMA (Direct Memory Access) between the pre-registered source buffer and the pre-registered destination buffer using the physical addresses. Control then continues to block 899 where the function returns.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of the invention. But, the invention may be practiced without these specific details. In other instances, well-known circuits, structures, and techniques have not been shown in detail in order not to obscure the invention.

What is claimed is:

1. A method comprising:
pre-registering a buffer with a remote electronic device prior to a data transfer that is to use the buffer, wherein the pre-registering further comprises sending a pre-registration message to the remote electronic device, wherein the pre-registration message comprises an identifier of a translation table and an identifier of an entry in the translation table.

2. The method of claim 1, further comprising:
creating a token that represents the buffer; and
performing the data transfer using the token.

3. The method of claim 1, wherein the pre-registering further comprises:
receiving an acknowledgment from the remote electronic device in response to the pre-registration message; and
turning a valid indicator on in the entry in response to the acknowledgement.

4. An apparatus comprising:
means for verifying that a buffer is within memory allocated to a partition in a logically-partitioned electronic device;
means for finding a translation table associated with a connection between the partition and a remote partition in a remote electronic device; and
means for creating a token that represents the buffer based on an entry in the translation table.

5. The apparatus of claim 4, wherein the means for creating the token further comprises:
means for sending a pre-registration message to the remote electronic device, wherein the pre-registration message comprises an identifier of the translation table and an identifier of the entry.

6. The apparatus of claim 5, wherein the means for creating the token further comprises:
means for receiving an acknowledgement from the remote electronic device in response to the pre-registration message.

7. The apparatus of claim 5, wherein the token comprises:
an identifier of the entry in the translation table and an offset into the buffer.

8. A signal-bearing medium encoded with instructions, wherein the instructions when executed comprise:
finding a translation table associated with a connection between a partition in a logically-partitioned electronic device and a remote partition in a remote electronic device;
sending a pre-registration message to the remote electronic device, wherein the pre-registration message comprises an identifier of the translation table and an identifier of an entry in the translation table, wherein the entry is associated with a buffer; and
creating a token that represents the buffer based on the entry in the translation table.

9. The signal-bearing medium of claim 8, further comprising:
verifying that the buffer is within memory allocated to the partition.

10. The signal-bearing medium of claim 8, wherein the creating further comprises:
creating the token based on an identifier of the entry and an offset into the buffer.

11. The signal-bearing medium of claim 8, further comprising:
setting an address of the buffer and a valid indicator in the entry.

12. An electronic device comprising:
a processor; and
a storage device encoded with instructions, wherein the instructions when executed by the processor comprise:
creating a first entry in a translation table, wherein the first entry comprises a first address of a first buffer and a first valid indicator, wherein the first buffer is associated with a first partition in the electronic device,
creating a first token that represents the first buffer based on the first entry, and
creating a second entry in the translation table, wherein the second entry comprises a second address of the second buffer in a remote electronic device and a second valid indicator, wherein the second buffer is associated with a second partition in the remote electronic device.

13. The electronic device of claim 12, wherein the instructions further comprise:
   returning the first token to the first partition for use in a DMA (Direct Memory Access) operation between the first buffer and the second buffer.

14. The electronic device of claim 12, wherein the creating the second entry is in response to a pre-registration message from the remote electronic device.

15. The electronic device of claim 12, wherein the instructions further comprise:
   turning the second valid indicator on; and
   sending an acknowledgement to the remote electronic device.

* * * * *